United States Patent
Takahashi

(10) Patent No.: US 8,693,849 B2
(45) Date of Patent: Apr. 8, 2014

(54) SOURCE OPTIMIZED DYNAMIC TRICKPLAY

(75) Inventor: Eduardo S. C. Takahashi, Portland, OR (US)

(73) Assignee: ARRIS Solutions, Inc., Suwanee, GA (US)

(*) Notice: Subject to any disclaimer, the term of this patent is extended or adjusted under 35 U.S.C. 154(b) by 1768 days.

(21) Appl. No.: 12/005,986

(22) Filed: Dec. 28, 2007

(65) Prior Publication Data

US 2008/0187283 A1 Aug. 7, 2008

Related U.S. Application Data

(60) Provisional application No. 60/878,034, filed on Dec. 29, 2006.

(51) Int. Cl.
*H04N 5/783* (2006.01)

(52) U.S. Cl.
USPC ........... 386/343; 386/344; 386/345; 386/346; 386/347; 386/348; 386/349; 386/350; 386/351; 386/352

(58) Field of Classification Search
USPC .......................................... 386/68, 343–352
See application file for complete search history.

(56) References Cited

U.S. PATENT DOCUMENTS

| | | | |
|---|---|---|---|
| 5,864,682 A | 1/1999 | Porter et al. | |
| 6,112,226 A * | 8/2000 | Weaver et al. | 709/203 |
| 6,327,421 B1 * | 12/2001 | Tiwari et al. | 386/326 |
| 7,237,254 B1 | 6/2007 | Omoigui | |
| 7,412,149 B2 * | 8/2008 | Cohen et al. | 386/343 |
| 7,440,674 B2 * | 10/2008 | Plotnick et al. | 386/343 |
| 2002/0136406 A1 | 9/2002 | Fitzhardinge et al. | |
| 2006/0117357 A1 | 6/2006 | Surline | |
| 2007/0031110 A1 * | 2/2007 | Rijckaert | 386/68 |

FOREIGN PATENT DOCUMENTS

| | | |
|---|---|---|
| EP | 0 812 112 A | 12/1997 |
| JP | 8-154230 | 6/1994 |
| JP | 2004-140679 | 5/2004 |
| JP | 2004-515941 | 5/2004 |
| JP | 2004-343201 | 12/2004 |
| WO | WO 96/31065 A | 10/1996 |
| WO | 2004/102571 | 5/2004 |

OTHER PUBLICATIONS

Gemmell D J et al: "Multimedia Storage Servers: A Tutorial" May 1, 1995, Computer, IEEE, Service Center, Los Alamitos, CA, US, pp. 40-49, XP000517832 ISSN: 0018-9162.
EPO Extended Search Report for EP 07150464.1, mailed on Apr. 28, 2008.
JPO Office Action for JP 2007-339704, mailed on Apr. 24, 2012.
JPO Office Action for JP 2007-339704, mailed on Sep. 20, 2011.
EPO Office Action for EP 07150464.1, mailed on Nov. 20, 2008.

* cited by examiner

Primary Examiner — Ghazal Shehni
(74) Attorney, Agent, or Firm — Troy A. Van Aacken

(57) ABSTRACT

At least one trickplay source file is generated from original media content. Trickplay view files for rendering particular trickplay view rates are then generated from the trickplay source file.

10 Claims, 3 Drawing Sheets

SOURCE OPTIMIZED DYNAMIC TRICKPLAY

PRIORITY CLAIM

Priority is claimed to U.S. provisional patent application with the title SOURCE OPTIMIZED DYNAMIC TRICKPLAY, having application No. 60/878,034, filed on Friday, Dec. 29, 2006.

TECHNICAL FIELD

The present disclosure relates to media trickplay.

BACKGROUND

One limitation of conventional dynamic trick play generation is that the view files reference only a sub-set of the I-frames present in the source MPEG content. That makes disk I/O very inefficient, especially on systems based on RAID volumes when one of the data disks is off-line. For example, if I-frames occur every 0.5 second on a 4 Mbps stream, then a full stripe read of a 5+1 RAID array with a 512 kb block size will yield only about 10 I-frames. Only a fraction of those are actually useful when constructing trick play view files with greater than 1× playback rates. For example, if I-frames are on average 50 kb and the desired trick play speed uses only 5 I-frames from a RAID stripe, the effectiveness of the data read is only (5*50 kb)/(5*512 kb), which is less than 10%.

Under normal conditions (e.g. where no RAID reconstruction is required) it is not necessary to read the full stripe in order to obtain the desired I-frames. In the best case, a full disk block read is required, while in the worst case may involve reading two disk blocks when an I-frame spans blocks.

Another limitation of conventional dynamic trick play generation is that the source MPEG content usually includes several independent media streams. Trick play view streams need to be fully compliant MPEG-bitstreams, but simple cut-and-past operations on I-frames could produce non-contiguous bitstreams. A solution used in the past was the insertion of transport stream discontinuity indicators between each pair of I-frames, however some set top boxes do not handle discontinuities correctly. Another approach used in the past was to perform filtering in real time so that the unwanted media streams could be excluded. That adds significant overhead to the real time processor, because the unwanted packets have to be located, and the I-frame fragments need to be reassembled.

The limitations above motivated the development of multi-asset trick play mechanisms where all allowable trick play speeds were pre-generated as part of the content ingest mechanism. Some drawbacks of multi-asset trick play mechanisms are the lack of flexibility (can only use the pre-generated trick play speeds) and the need for extra storage space for all trick play files generated. Also, in the network DVR scenario with real time playback requirements, efficient disk I/O and latency from live feed are conflicting objectives. The network DVR process must record not only the main view data, but also all the required trick play view files. Because trick play view data is generated more slowly, the network DVR process must write partial blocks/stripes in order to ensure availability of live data, which increases the disk I/O bandwidth utilization and imposes extra processing load on the system.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

In one embodiment, a trick play source file is generated from the original content that includes only I-frames, not P and B frames. Audio is also excluded from the generated trickplay source file. Subtitles and/or close-captioning may also be excluded. Data packets may be included or not, depending on the implementation. For example, cue packets for advertisement insertion may be kept, relocated from other positions, excluded, or even inserted, depending on the application and environment. Encryption information may be inserted to facilitated decoding at the set top box. The trick play source is pre-generated, before receiving viewer requests to render at different playback rates. Trickplay view files for specific viewing rates are generated dynamically, when viewer requests are received (e.g. for fast-forward, fast-rewind, slow-forward, slow-reverse, etc.).

In the network DVR scenario with real time playback requirements, more efficient use of disk I/O bandwidth can be achieved by writing a single trick play source file instead of individual trick play files for each trick play speed. Even though partial block/stripe disk I/O may still be involved, it may be done only once per I-frame in the original content instead of multiple times (for each trick play view file).

Figure 1:
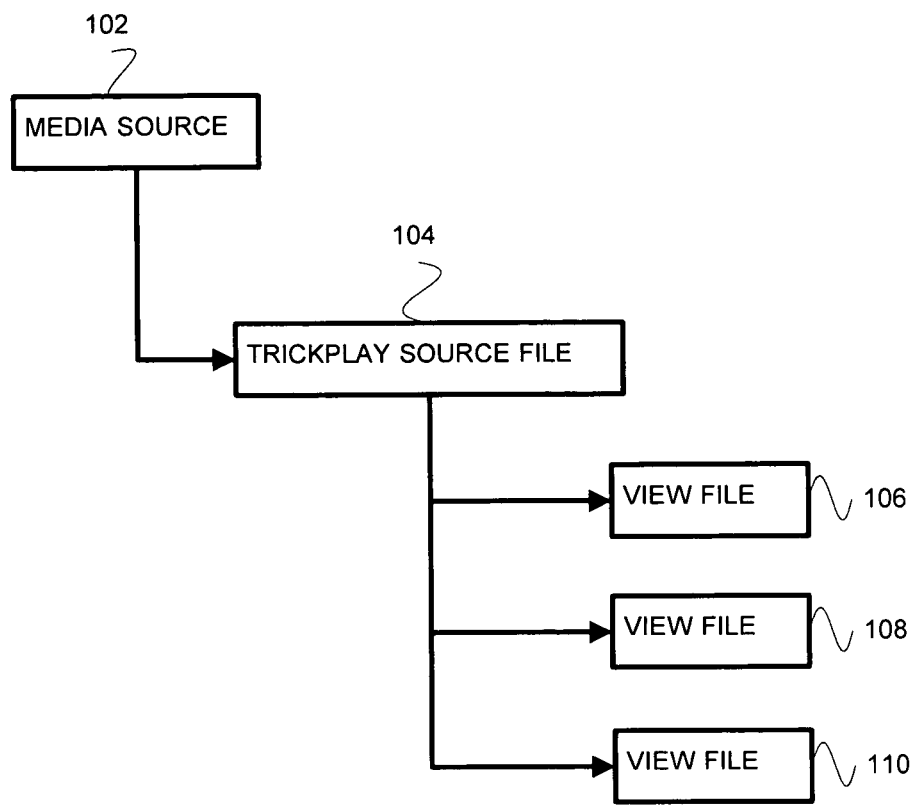
FIG. 1 is a block diagram of an embodiment of files involved in rendering trickplay.

FIG. 1 is a block diagram of an embodiment of files involved in rendering trickplay. A trickplay source file 104 is generated from the original media source 102. The trickplay source file 104 may be generated and stored by, for example, a video server or DVR device prior to any trickplay viewing requests. Specific trickplay view files 106-110, for viewing content of the media source 102 at different rates, may be generated dynamically for particular requested view rates.

The RAID stripe example of the background discussion may now store up to 51 I-frames. A 2× play rate (twice normal play rate) trickplay view file may use approximately half of the available I-frames in a stripe, setting the read effectiveness at about 50%. A 512 k block may hold approximately 10 I-frames. View files for any trick play speed may be generated from the trickplay source file, even slow motion. The trickplay source file may require only a fraction of the storage requirements of the original content. For example, in the background example, the trick play source file may be less then 10% of the normal speed MPEG content source file.

Figure 2:
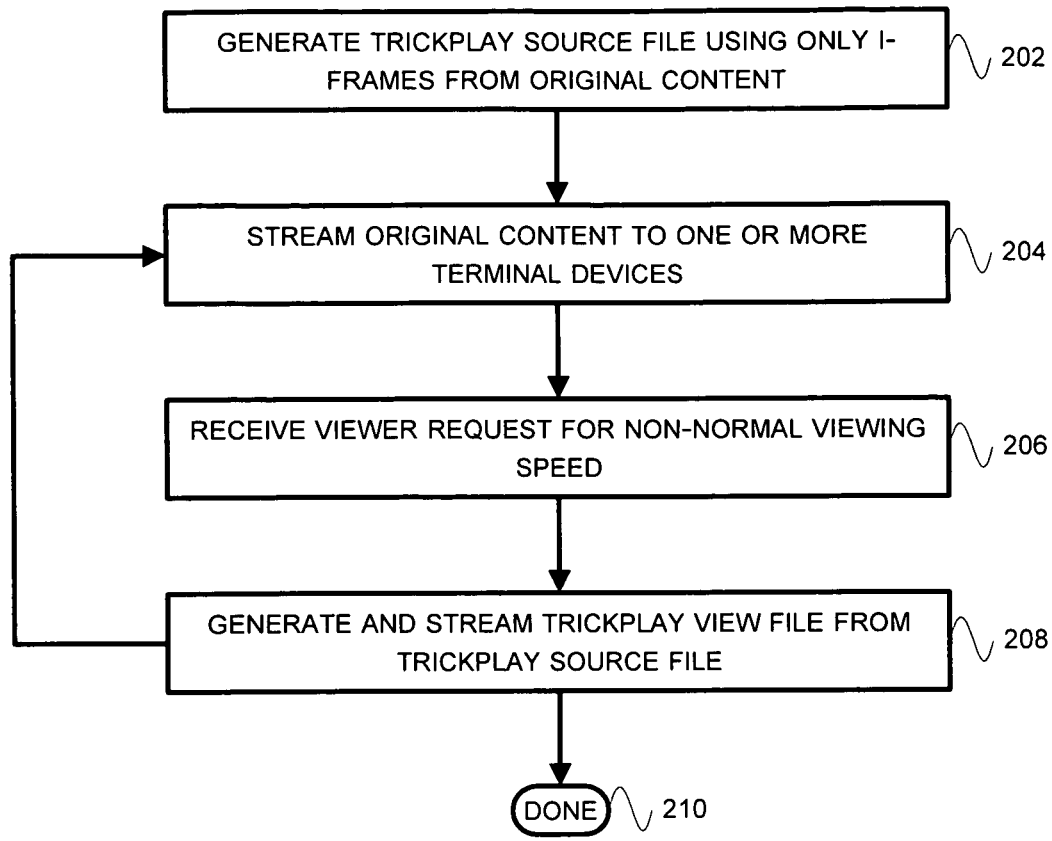
FIG. 2 is a flow chart illustrating an embodiment of a trickplay process.

FIG. 2 is a flow chart illustrating an embodiment of a trickplay process. At 202 the trickplay source file is generated using only I-frames from the original media content. At 204 the original content is streamed, for example to provide cable video broadcast programming, or video on demand. At 206 a request is received, for example from a viewer's set top box, for non-normal viewing rate, e.g. a trickplay request is received. At 208 a trickplay view file is generated for the requested rate from the trickplay source file.

In one embodiment, the trick play speeds are restricted to a predetermined set, for example 5× playback rates and multiples thereof. In this example, it may be determined a-priori which I-frames are not required for trickplay view generation and those I-frames may be excluded from the trick play source file, further reducing its size.

In one embodiment the CPU load to generate view files may be reduced by utilizing the lowest-speed trick play view file as the dynamic trick play source file. For example, if 5× is the lowest-speed trick play view file that will be generated, this file may be generated statically (a-priory to any viewer trickplay requests), and −5×, 10×, and −10× view files may be generated dynamically from the 5× file according to viewer requests.

In some embodiments the use of a non-MPEG compliant trickplay source file formats may be employed to provide optimizations such as including certain "glue packets" in the trickplay source file, instead of requiring those to be dynamically added at view file generation time. Of course, some "glue packets" may by necessity only be added at the time the view files are generated. Also, some standard MPEG packets such as certain MPEG headers and I-frame timing and continuity information may be excluded to further reduce the trickplay source file size. Reducing the quantity of information between I-frames in the trickplay source file may provide greater control over I-frame alignment within disk block boundaries, eliminating or reducing the cases were multiple block reads are required because an I-frame spans multiple blocks.

A same tag file structure may be employed as in the case of conventional trick play with statically generated view files. Alternatively, when only a few trick play speeds are required, the tag file structure may be optimized to improve dynamic performance. In conventional static view file implementations, each trick play speed is associated with entries in the tag file. These entries identify all the I-frames in the view file for that speed, for the purpose of allowing access when playing the trickplay view file. In one embodiment of a modified tag file structure, each view file speed has an associated list of the I-frames to generate for that trickplay speed at viewing time, eliminating the need to dynamically decide which I-frames to use. Unlike the conventional static view file case, the tags for different view speeds all reference the same trickplay source file, not different view files.

Figure 3:
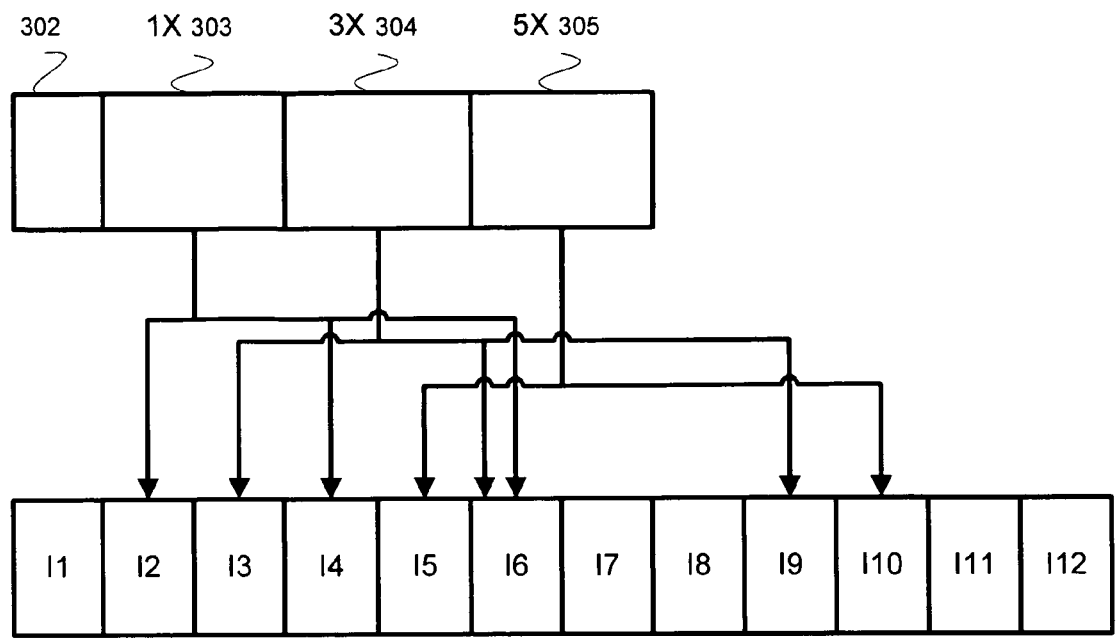
FIG. 3 is a block diagram of an embodiment of a tag file format.

FIG. 3 is a block diagram of an embodiment of a tag file format. The tag file includes a header 302 that identifies sections of the tag file for use with different view rates. In this example, section 303 comprises a tag list for a 1× (normal play) view rate, section 304 comprises a tag list for a 3× view rate, and section 305 comprises a tag list for a 5× view rate. In a conventional trickplay implementation, each view rate would have an associated view media file, and each tag list would reference I-frames in the corresponding media file. In the embodiment of FIG. 3, a single tag list is created in addition to the 1×, possibly prior to receiving any trickplay view requests, and that tag list references I-frames in the trickplay source file, not the original media content. In some embodiments, multiple tag lists for different permitted trickplay view rates may be pre-generated along with the trickplay source file.

The logic, files, data structures, and formats described herein may be implemented by logic within one or more devices. For example, they may be implemented by logic of a video server in a cable plant system for purposes of network DVR (e.g. the video server providing techniques to implement fast forward and rewind of content supplied via the cable plant).

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A nontransitory machine memory comprising logic that, when applied to affect the operation of a device, causes the device to:

generate at least one trickplay source file from original media content; and after receiving a request to view the original media content, stream the at least one trickplay source file if the request is for a lowest-speed available trickplay view rate;

if the request is to view at a rate different from the lowest-speed available trickplay view rate, dynamically generate and store on a storage volume a trickplay view file for rendering the requested trickplay view rate from the at least one trickplay source file.

2. The nontransitory machine memory of claim 1 further comprising logic to generate the at least one trickplay source file excluding one or more of audio, close-captioning, and subtitles of the original media content.

3. The nontransitory machine memory of claim 1 further comprising logic to generate the at least one trickplay source file comprising only I-Frames of the original media content.

4. The nontransitory machine memory of claim 1 further comprising logic to generate the at least one trickplay source file from the original media content prior to streaming the original media content.

5. The nontransitory machine memory of claim 1 further comprising logic to generate the trickplay view file dynamically, as the original media content is being streamed.

6. The nontransitory machine memory of claim 1 further comprising logic to generate a single trickplay source file needed to render the lowest-speed available trickplay rate.

7. The nontransitory machine memory of claim 1 further comprising logic to generate a single tag file for multiple trickplay rates, the tag file comprising tags that reference I-frames in the at least one trickplay source file, the tags identifying I-frames in the at least one trickplay source file to store in the trickplay view file on the storage volume.

8. A process for providing trickplay viewing of original media content over a streaming data network, the process comprising:

one or more network devices of the streaming data network generating a trickplay source file using only a minimum number of I-frames from the original media content to implement a slowest available trickplay view rate;

the one or more network devices streaming the original media content over the streaming data network;

the one or more network devices receiving a request from a viewer's device for a viewing rate of the original media content;

in response to the request from the viewer's device, the one or more network devices generating from the trickplay source file a trickplay view file for the viewing rate of the original media content, if the viewing rate of the original media content is different from the slowest available trickplay view rate, and providing playback from the trickplay source file otherwise.

9. The process of claim 8, further comprising:

the one or more network devices providing playback from the trickplay source file for requests for the slowest available trickplay view rate, and the one or more network devices generating from the trickplay source file trickplay view files for all other requested viewing rates.

10. The process of claim 8, further comprising when generating the trickplay source file, the one or more network devices excluding MPEG packets from the trickplay source file to create I-frame alignment within disk block boundaries.

* * * * *